United States Patent [19]

Uya

[11] Patent Number: 4,682,303
[45] Date of Patent: Jul. 21, 1987

[54] PARALLEL BINARY ADDER

[75] Inventor: Masaru Uya, Hirakata, Japan

[73] Assignee: Matsushita Electric Industrial Co., Ltd., Kadoma, Japan

[21] Appl. No.: 643,385

[22] Filed: Aug. 23, 1984

[30] Foreign Application Priority Data

Sep. 5, 1983 [JP] Japan .................. 58-163503

[51] Int. Cl.$^4$ .............................. G05F 7/50
[52] U.S. Cl. .................................. 364/788
[58] Field of Search ............... 364/784–788

[56] References Cited

U.S. PATENT DOCUMENTS 4,417,315 11/1983 Russell ................. 364/770
4,559,608 12/1985 Young et al. .......... 364/786

FOREIGN PATENT DOCUMENTS 59-5349A 1/1984 Japan ..................... 364/787
2127187A 4/1984 United Kingdom ........ 364/787

Primary Examiner—Archie E. Williams
Assistant Examiner—Long T. Nguyen
Attorney, Agent, or Firm—Cushman, Darby & Cushman

[57] ABSTRACT

A parallel binary adder has several blocked adders, wherein numbers of bits of adders are selected to be larger in higher order blocks than lower order blocks, thereby addition in all blocks will finish at the same time, thereby undue waiting time between the completion of the addition in several blocks can be eliminated, and thereby a faster parallel binary adder is obtainable.

4 Claims, 7 Drawing Figures

PARALLEL BINARY ADDER

BACKGROUND OF THE INVENTION

1. Field of the Invention:

The present invention relates generally to a parallel binary adder for carrying out digital addition, and particularly to a parallel binary adder capable of high speed addition for input data having an especially large number of bits.

2. Description of the Prior Art:

FIG. 1 shows a conventional parallel binary adder. This parallel binary adder is for computation of 26 bits addend A ($A_{25}$, $A_{24}$, $A_{23}$ ... $A_2$, $A_1$, $A_0$) and 26 bits augend B ($B_{25}$, $B_{24}$, $B_{23}$ ... $B_2$, $B_1$, $B_0$), to produce sums S ($S_{25}$, $S_{24}$, $S_{23}$ ... $S_2$, $S_1$, $S_0$) and a carry $C_{26}$. Therein, the circuit of FIG. 1 is constituted with CMOS FETs on an IC or LSI.

Numerals 1, 2 and 3 designate EXOR (exclusive OR) gates, and numerals 4, 5, 6 and 7 designate NAND gates, and numeral 8 designates an inverter, which are constituted with CMOS FETs. With respect to the input signals $A_0$, $A_1$, $A_2$, $A_3$ ... $A_{25}$, input signals $B_0$, $B_1$, $B_2$, $B_3$ ... $B_{25}$, sum output signals $S_0$, $S_1$, $S_2$, $S_3$ ... $S_{25}$, and carry output signals $C_0$, $C_1$, $C_2$, $C_3$ ... $C_{25}$ and $C_{26}$, the circuit of FIG. 1 gives the following relations:

$$\left.\begin{array}{l} S_0 = A_0 \oplus B_0, \; C_1 = A_0 \cdot B_0 \\ S_1 = (A_1 \oplus B_1) \oplus C_1, \; C_2 = (A_1 \cdot B_1) + (C_1 \cdot (A_1 \oplus B_1)) \\ \cdots \cdots \quad \cdots \cdots \\ \cdots \cdots \quad \cdots \cdots \\ S_{25} = (A_{25} \oplus B_{25}) \oplus C_{25}, \; C_{26} = (A_{25} \cdot B_{25}) + (C_{25} \cdot (A_{25} \oplus B_{25})) \end{array}\right\} \quad (1)$$

The right-hand circuit i.e., a first order circuit H, operates as half adder, and other circuits, namely, $F_1$, $F_2$ ... $F_{25}$, which are constituted in the same circuit configuration as each other, operate as full adders.

Since the EXOR gates have propagation delays corresponding to those of two stages of the general gates, the total addition time of the conventional 26-bit parallel binary adder of FIG. 1 requires propagation delays for 52 stages of gate logic. Generally, an n-bit parallel binary adder requires addition time corresponding to 2n stages of gate logic, and so shortening of the addition time has been sought after.

SUMMARY OF THE INVENTION

The purpose of the present invention is to provide a high speed parallel binary adder wherein the addition speed is drastically improved.

The high speed parallel binary adder can be utilized in every field which requires high speed digital processing such as computers, array processors, digital signal processors or the like.

The parallel binary adder in accordance with the present invention comprises:

a first order block-adder for adding a first blocked addend to a first blocked augend with a carry input of 0, a row of block-adders having a second order block-adder and subsequent order block-adders for adding respective blocked addend to respective blocked augends in respective block-adders, each block-adder comprising:

a first adder for adding the blocked addend to the blocked augend under a first premise that the carry input data is 0, a second adder for adding blocked addend to blocked augend under a second premise that carry input data is 1, a data selector for selectively issuing either one output signal of the first adder or the second adder as a block-sum output signal, responding to a block-carry input signal for the block-adder, a block-carry signal generator for generating a block-carry signal based on a carry output signal from the first adder and a carry output signal from the second adder and a block-carry signal from an adjacent lower order block, the number of bits of the first adders and the second adders in a higher order block-adder being larger than those of an adjacent lower order block-adder, thereby to substantially synchronize incoming times of the carry output signals from the first adder and the second adder with the block-carry signal from the lower adjacent order block-adder.

As a result of the above-mentioned configuration, in the parallel binary adder in accordance with the present invention, the addend and augend are divided into several blocks, and respective blocked addends are added to the blocked augends in two kinds of adders, that is, in a first kind of adders the additions are made under a first premise that each carry input is 0 in respective first adders of each block, and in the second kind of adders the additions are made under a second premise that the carry input is 1 in respective second adders in each block. In the parallel binary adder of the above-mentioned configuration, either one appropriate output signal from the above-mentioned two kinds of adders in each block is selectively issued as the block output signal, based on each block-carry input signal for the block given from the block adder of the lower order; and also, a right block carry output signal from the block is issued therefrom to an adjacent block adder of a higher order; and furthermore, the number of bits of the first kind of adder and the second kind of adder in a higher order block is set to be larger than those of an adjacent lower order block, thereby to substantially synchronize incoming times of the output signal from the first adder, the output signal from the second adder and the block-carry signal from the lower adjacent order block; thereby the useless time of waiting between output signals from respective blocked adders is eliminated and very fast parallel binary adding is realized.

DESCRIPTION OF THE PREFERRED EMBODIMENT

Figure 1:
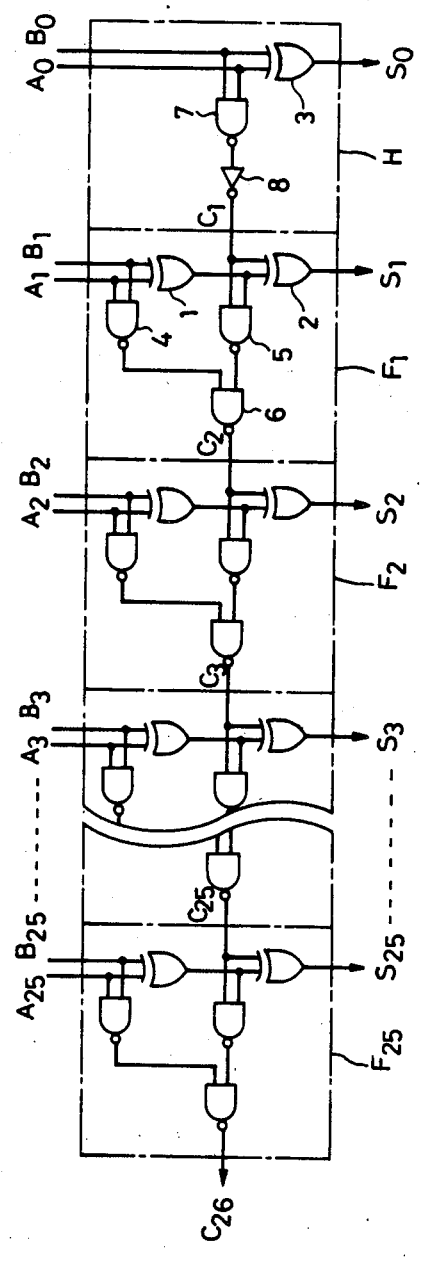
FIG. 1 is the circuit diagram of the conventional parallel adder.
Figure 2:
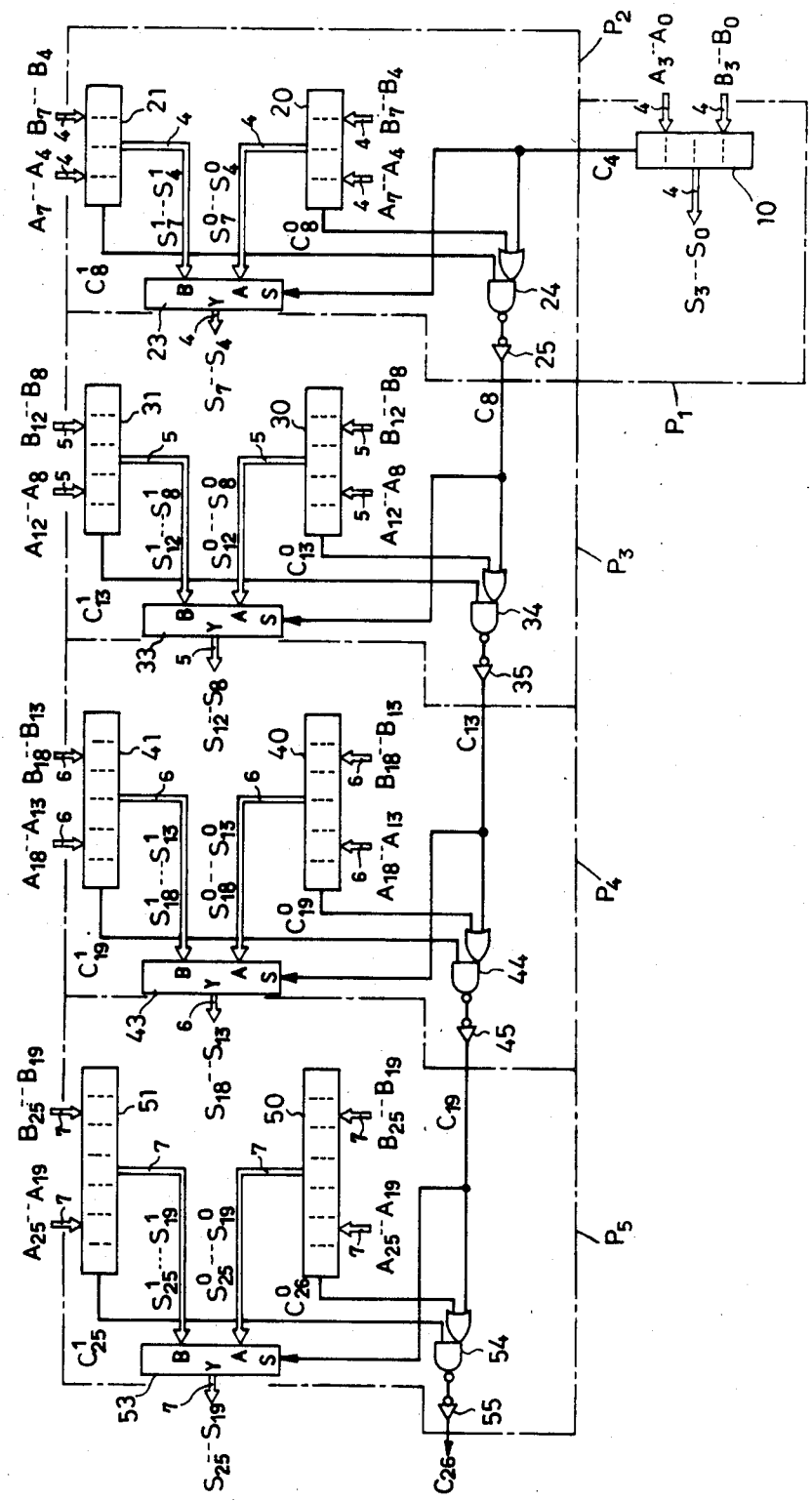
FIG. 2 is a circuit diagram of a parallel adder in accordance with the present invention.

A circuit configuration of a preferred embodiment is shown in FIG. 2. The circuit of FIG. 2 is for an embodiment, wherein addend A ($A_{25}$, $A_{24}$ ... $A_0$) is added to augend B ($B_{25}$, $B_{24}$ ... $B_0$), to make sums S ($S_{25}$, $S_{24}$ ... $S_0$) and a carry output signal $C_{26}$. The addend A and the augend B are divided into five blocks $P_1$, $P_2$, $P_3$, $P_4$ and $P_5$ and the additions are parallelly carried out simultaneously, and sum outputs of five blocks, namely $S_3$ ... $S_0$, $S_7$ ... $S_4$, $S_{12}$ ... $S_8$, $S_{18}$ ... $S_{13}$ and $S_{25}$ ... $S_{19}$ as well as the last stage carry output signal $C_{26}$ are issued substantially at the same time without useless waiting time between each output.

Figure 3:
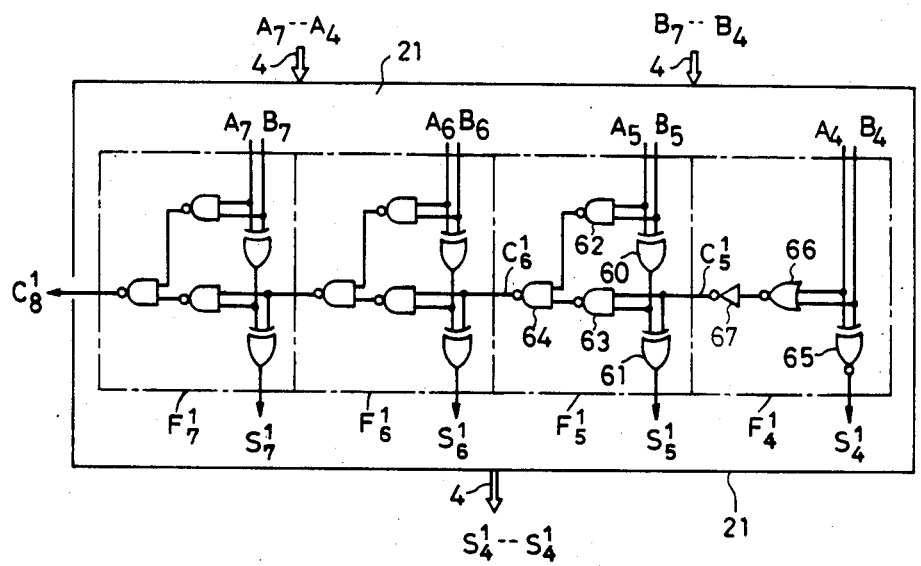
FIG. 3 is a circuit diagram of detailed configuration of a first adder 21 of FIG. 2.
Figure 4:
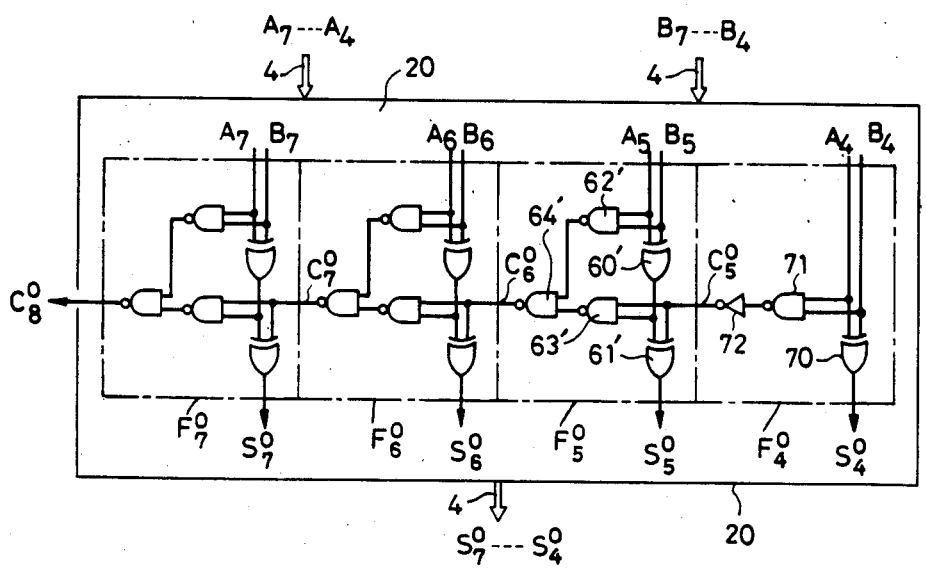
FIG. 4 is a detailed circuit diagram of a second adder 20 of FIG. 2.

In the above-mentioned parallel binary adder circuit in accordance with the present invention, adders 10, 20 and 21 are 4-bit adders, adders 30 and 31 are 5-bit adders, adders 40 and 41 are 6-bit adders and adders 50 and 51 are 7-bit adders; and the adders 10, 20, 30, 40 and 50 are the first kind of adders which carry out addition under the premise that carry inputs thereto are 0, and adders 21, 31, 41 and 51 are the second kind of adders which carry out addition under the premise that carry inputs thereto are 1. Actual constructions of the adders 21 and 20 are shown in FIG. 3 and FIG. 4, respectively. In the circuit of FIG. 3, gates 60 and 61 are EXOR gate made with CMOS transistor constitution, gates 62, 63 and 64 are NAND gates made with CMOS constitution.

Since sum output signal $S_5^1$ and carry output signal $C_6^1$ of the circuit of FIG. 3 are represented by the following equations (2), the circuit $F_5^1$ can operate as a full adder.

$$\left. \begin{array}{l} S_5^1 = (A_5 \oplus B_5) \oplus C_5^1 \\ C_6^1 = (A_5 \cdot B_5) + (C_5^1 \cdot (A_5 \oplus B_5)) \end{array} \right\} \quad (2)$$

The component circuits $F_6^1$ and $F_7^1$ are constituted in the same way as that of the component circuit $F_5^1$. In the component circuit $F_4^1$, a gate 65 is an EXNOR (Exclusive NOR) gate made with CMOS constitution, and a gate 66 is a NOR gate made with CMOS constitution, and a gate 67 is an inverter made with CMOS constitution. Since sum output signal $S_4^1$ and carry signal $C_5^1$ of the component circuit $F_4^1$ can be represented by the following equation (2):

$$\left. \begin{array}{l} S_4^1 = \overline{A_4 \oplus B_4} = (A_4 \oplus B_4) \oplus 1 \\ C_5^1 = A_4 + B_4 = (A_4 \cdot B_4) + (1 \cdot (A_4 \oplus B_4)) \end{array} \right\} \quad (3)$$

The component circuit $F_4^1$ can operate as a full adder where the carry input thereto is 1.

Nextly, a detailed circuit configuration of the adder 20 will be described with reference to FIG. 4. In the circuit, gates 60' and 61' are EXOR gates made with CMOS transistor constitution, gates 62', 63' and 64' are NAND gates made with CMOS constitution.

Since the sum output signal $S_5^0$ and the carry output signal $C_6^0$ of the circuit of FIG. 4 are represented by the following equations (4), the circuit $F_5^0$ can operate as a full adder.

$$\left. \begin{array}{l} S_5^0 = (A_5 \oplus B_5) \oplus C_5^0 \\ C_6^0 = (A_5 \cdot B_5) + (C_5^0 \cdot (A_5 \oplus B_5)) \end{array} \right\} \quad (4)$$

The component circuits $F_6^0$ and $F_7^0$ are constituted in the same way as that of the component circuit $F_5^0$. In the component circuit $F_4^0$, a gate 70 is an EXOR gate made with CMOS constitution, and a gate 71 is a NAND gate made with CMOS constitution, and a gate 72 is an inverter made by CMOS constitution. Since sum output signal $S_4^0$ and carry signal $C_5^0$ of the component circuit $F_4^0$ can be represented by the following equation (5):

$$\left. \begin{array}{l} S_4^0 = A_4 \oplus B_4 = (A_4 \oplus B_4) \oplus 0 \\ C_5^0 = A_4 \cdot B_4 = (A_4 \cdot B_4) + (0 \cdot (A_4 \oplus B_4)) \end{array} \right\} \quad (5)$$

the component circuit $F_4^0$ operates as a half adder, that is a full adder in the case when the carry input thereto is 0.

The circuits of the adder 10 and the adder 20 are configured in the same way. The first kind of adders 20, 30 40 and 50 are for adding blocked addends ($A_7$-$A_4$, $A_{12}$-$A_8$, $A_{13}$-$A_{18}$ and $A_{25}$-$A_{19}$) to blocked augends ($B_7$-$B_4$, $B_{12}$-$B_8$, $B_{18}$-$B_{13}$ and $B_{25}$-$B_{19}$) under a first premise that the carry input data is 0, but the number of bits of the adder increases by 1 from the adder 20 to the adder 30, from the adder 30 to the adder 40 and from the adder 40 to the adder 50, respectively. On the other hand, the circuits of the adder 11 and the adder 21 are configured in the same way. The second kind of adders 21, 31, 41 and 51 are for adding blocked addends ($A_7$-$A_4$, $A_{12}$-$A_8$, $A_{13}$-$A_{18}$ and $A_{25}$-$A_{19}$) to blocked augends ($B_7$-$B_4$, $B_{12}$-$B_8$, $B_{18}$-$B_{13}$ and $B_{25}$-$B_{19}$) under a first premise that the carry input is 1, but the number of bits of the adder increases by 1 from the adder 21 to the adder 31, from the adder 31 to the adder 41 and from the adder 41 to the adder 51, respectively.

Each block-adder $P_2$, $P_3$, $P_4$ or $P_5$ has data a selector 23, 33, 43 or 53, respectively, which is for selectively issuing block sum output signal $S_7$-$S_4$, $S_{12}$-$S_8$, $S_{18}$-$S_{13}$ or $S_{25}$-$S_{19}$ responding to a selection signal applied to its input terminal S from the block-carry output terminal $C_4$, $C_8$, $C_{13}$ or $C_{19}$ of the adjacent lower order block-adder $P_1$, $P_2$, $P_3$ or $P_4$, respectively. And therefore, when selection signals (i.e. the block-carry output signal of the adjacent lower order block-adder) is 0, the data selector 23, 33, 43 or 53 selects input signal A. On the contrary, when the selection signal S is 1, the data selector selects input signal B.

Each block-adder further includes a block-carry signal generator constituted by OR-NAND gate 24, 34, 44 or 54 made with CMOS constitution, and an inverter 25, 35, 45 or 55, respectively.

The operation of the embodiment described with reference to the drawings FIG. 2 through FIG. 4 will not be described. As shown in FIG. 2 and FIG. 4, block-sums $S_7^0$-$S_4^0$, $S_{12}^0$-$S_8^0$, $S_{18}^0$-$S_{13}^0$ or $S_{25}^0$-$S_{19}^0$ for the case of block-carry signals given from the adjacent lower order adder being 0 together with block carry signals $C_8^0$, $C_{13}^0$, $C_{19}^0$ or $C_{26}^0$, are issued as the output signals from the first kind of adder 20, 30, 40 or 50 of the block-adders $P_2$, $P_3$, $P_4$ or $P_5$, respectively. And on the other hand, as shown in FIG. 2 and FIG. 3, block-sums $S_7^1$-$S_4^1$, $S_{12}^1$-$S_8^1$, $S_{18}^1$-$S_{13}^1$ or $S_{25}^1$-$S_{19}^1$ for the case of block-carry signals given from the adjacent lower order adder being 1, together with block-carry signals $C_8^1$, $C_{13}^1$, $C_{19}^1$, $C_{26}^1$, are issued as the output signals from the second kind of adder 21, 31, 41 or 51 of the block adder $P_2$, $P_3$, $P_4$ or $P_5$, respectively. Block-carry input signal $C_4$ of the block-adder $P_2$ (which is given from the block-adder $P_1$ as its block-carry output) is given to the select input terminal S of the data selector 23, and accordingly the data selector 23 outputs appropriately selected sum output signals $S_7$-$S_4$ of the block-adder $P_2$. The block-carry output signal $C_8$ of the block adder $P_2$ is determined by the block-carry signal generator consisting of the OR-NAND gate 24 and the inverter 25 in the manner as shown in the following truth table.

| $C_4$ | $C_8^1$ | $C_8^0$ | $C_8$ |
|---|---|---|---|
| 0 | 0 | 0 | 0 |
|   | 1 | 0 | 0 |
|   | 1 | 1 | 1 |
| 1 | 0 | 0 | 0 |
|   | 1 | 0 | 1 |
|   | 1 | 1 | 1 |

It is to be noted that the following relation exists:

$$C_8^1 \geq C_8^0$$

and therefore there is no likelihood of $C_8^1 = 0$ and $C_8^0 = 1$. Since the truth table gives $$C_8 = C_8^1 (C_8^0 + C_4) \tag{6},$$

the block-carry output $C_8$ is given as the output of the inverter 25. The OR-NAND gate 24 and the inverter 25 together constitute the block-carry signal generator of the block-adder. The logic equation of the block-carry signal generator is not limited to the above-mentioned equation (6), but some other relation may be used. For instance, by using a redundancy term, which is not represented in the truth table, combined thereto, the following relationships hold:

$$\begin{aligned} C_8 &= (C_4 \cdot C_8^1) + (\overline{C_4} \cdot C_8^0) \\ \text{or} \\ C_8 &= (C_4 \cdot C_8^1) + C_8^0 \end{aligned} \tag{7}$$

Figure 6A:
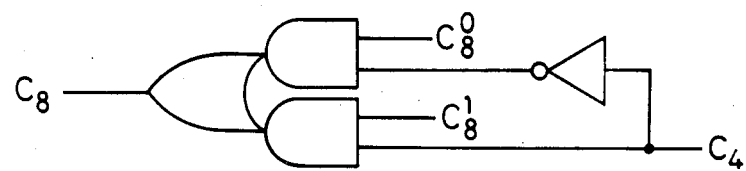
FIGS. 6A and 6B are circuit diagrams of modified logic gates of the block carry signal generator.
Figure 6B:
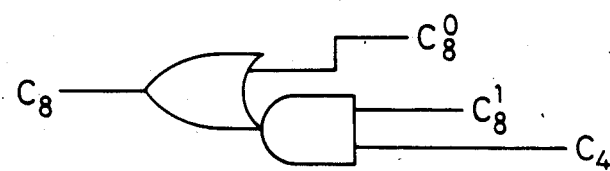

For such modified examples, the logic gates may be AND-OR gates as shown in FIGS. 6A and 6B.

The block-adders in subsequent or higher orders $P_3$, $P_4$ and $P_5$ are configured in the same manner as that of $P_2$ and operate in the same manner. As a result, the highest order carry signal $C_{26}$ is issued from the highest order block-adder $P_5$. And sums $S_{25}$-$S_0$ are issued from the output terminals of data selectors 23, 33, 43 and 53 in the divided form.

Now, addition time, shortness of which is an important feature of the present invention, will be described in detail. The addition time is represented in the following description by the number of stages of gate logic. EXOR gates 60, 61, 60', 60", and data selectors 23, 33, ... are counted as two stages of gate logic. In the 4-bit adder shown in FIG. 3 or in FIG. 4, sum output signals $S_4^1$, $S_5^1$, $S_6^1$, $S_7^1$ or $S_4^0$, $S_5^0$, $S_6^0$, $S_7^0$ are obtainable with propagation delays for two stages of gate logic in that order, and the output signals $S_7^1$ and $C_8^1$ or the output signal $S_7^0$ and $C_8^0$ are issued after gate-delays for 8 logic gates.

Figure 5:
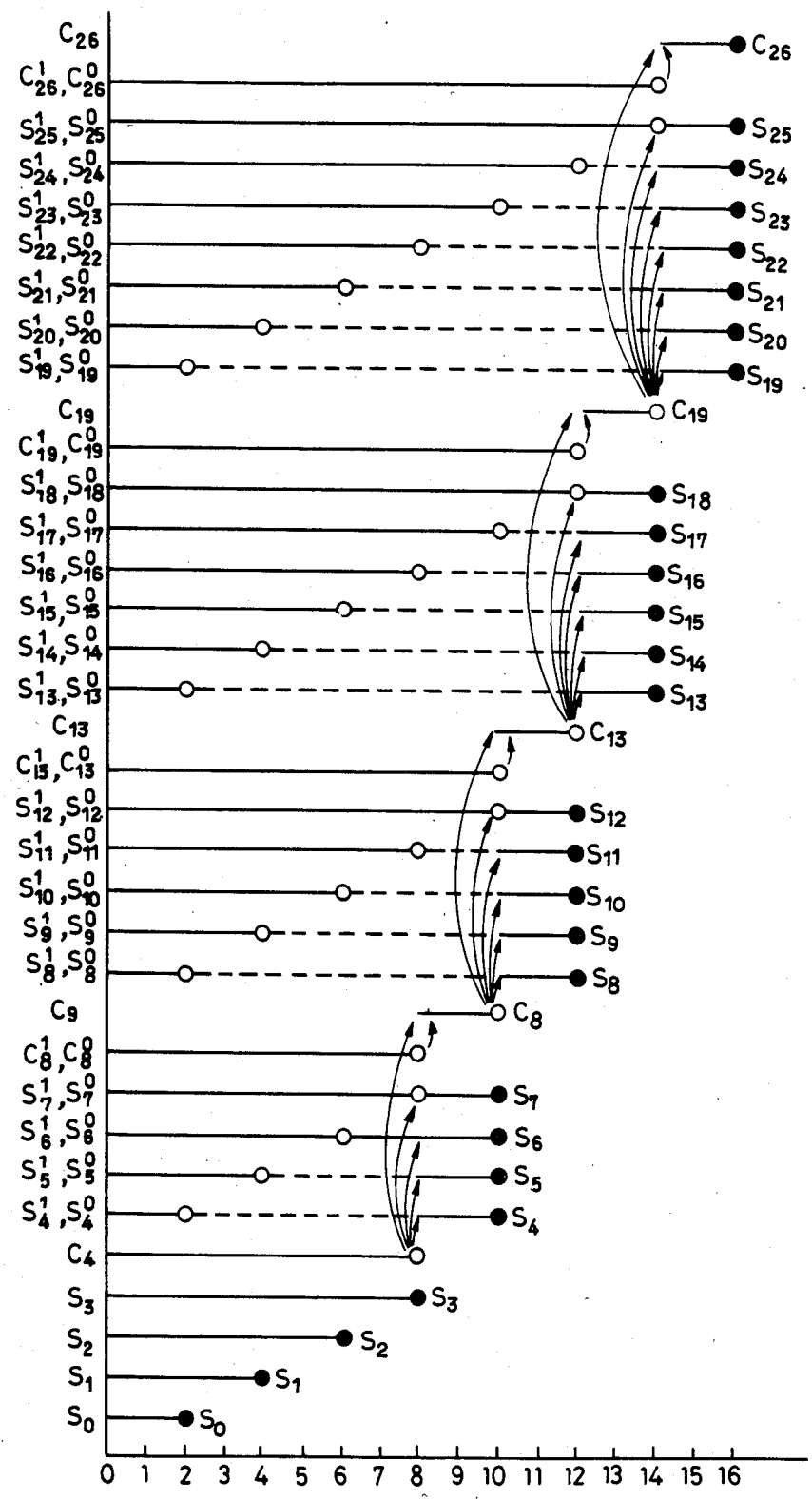
FIG. 5 is a time chart showing output timings of various signals of the circuit of FIG. 2.

By applying the above-mentioned explanation fully to the full circuit of FIG. 2, signals of various parts of the circuit of FIG. 2 can be represented as shown in the time chart of FIG. 5. Block carry output signals $C_4$, $C_8^1$ and $C_8^0$ reach the block-carry signal generator after gate-delays for 8 stages, and further after delay time for two stages of gate logic, namely after the delay time for 10 stages of gate logic from the beginning, the carry output signal $C_8$ is issued to the third block adder $F_3$. At the same time, the sum output signals $S_7$-$S_4$, which are selected by utilizing the carry input signal $C_4$, are issued to the third block-adder $P_3$. The third block-adder $P_3$ adds five-bit data, which is larger by 1 bit than 4 bits of the second block-adder $P_2$. The reason that the third block-adder $P_3$ is designed to make the number of bits larger by 1 bit than the number of bits of the second block $P_2$ is for the sake of adjusting the delay time of the block-carry signal generator, thereby saving useless waiting time. Accordingly, as shown in FIG. 5, when the block-carry signal $C_8$ is issued, the carry output signals $C_{13}^1$ and $C_{13}^0$ are issued from the adders 31 and 30 of the third block-adder $P_3$, and there is no wasting of time in issuing the resultant carry output signal $C_{13}$ to the fourth block-adder $P_4$. Furthermore, at the time of issuing the carry output signal $C_8$, that is, at the time after the delay time for 10 stages of gate logic from the beginning, the sum output signals $S_{12}^1$ and $S_{12}^0$ are issued from the adders 30 and 31. Therefore, the data selector 33 can appropriately select the output signal without any wasting of time, and can issue block-sum output signals $S_{12}$-$S_8$ to the fourth block-adder at the time after the delay time for 12 stages of gate logic from the beginning. For subsequent stages of block-adders, in quite the same manner the block-sum output signals $S_{18}$-$S_{13}$ are issued at the time after the delay time for 14 stages of gate logic, and also the block-sum output signals $S_{25}$-$S_{19}$ are issued at the time after the delay time for 16 stages of gate logic.

As shown in FIG. 5 by arrows, the circuit is designed such that the carry signals $C_8^1$ and $C_8^0$ are obtainable simultaneously with the carry signal $C_4$, the carry signals $C_{13}^1$ and $C_{13}^0$ are obtainable sinultaneously with the carry signal $C_8$, the carry signals $C_{19}^1$ and $C_{19}^0$ are obtainable simultaneously with the carry signals $C_{13}$, and the carry signal $C_{26}^1$ and $C_{26}^0$ are issued simultaneously with the carry signal $C_{19}$. This parallel binary adder apparatus allows no wasting of time in waiting for the carry signal. And at the last stage, the last carry output signal $C_{26}$ and the sums $S_{25}$-$S_0$ are obtainable at the time after the delay time for 16 stages of gate logic.

In practical examples, for instance, of 24-bit data adding and 32-bit data adding, the parallel binary adder comprising 16 stages of gate logic and 18 stages of gate logic, respectively, the adding speed becomes 3 times to 3.5 times higher in comparision with the conventional adding time of 48 stages of logic gate delay and 64 stages of logic gate delay, respectively. That is, the parallel binary adder can perform drastically improved high speed adding in comparision with the conventional ones.

When the number of bits of the first block adder $P_1$ is N bits, then the preferable number of bits for the second, third, fourth and fifth block adders, $P_2$, $P_3$, $P_4$ and $P_5$ become respectively N, N+1, N+2 and N+3; and for further longer data, the dispositions of the number of bits of respective block-adders may be disposed in the same way.

Provided that number of data is 26 bits, when $N=3$, the addition time is 16 stages of logic gate, and when $N=5$, the addition time is 18 stages of logic gate. In order to minimize the size of hard ware, the number $N$ is preferably large, and accordingly for number of data of 24–32 bits, it is preferable to select $N=4$ as done in the embodiment of FIG. 2.

Though the embodiment of FIG. 2 utilizes various gates made of CMOS transistors, the circuitry can be realized by other logic gates, such as TTL.

As has been described with reference to the above-mentioned preferred embodiment, the parallel binary adder in accordance with the present invention can realize high speed computation of three times or higher speed, and therefore, this invention is very much useful in the technical field of high speed numerical computation.

What is claimed is:

1. A parallel binary adder comprising:

first order block-adder means for adding a first blocked addend to a first blocked augend with a carry input of 0, a row of block-adder means having a second order block-adder means and subsequent order block-adder means for adding respective blocked addends to respective blocked augends in respective block-adder means, each block-adder means comprising:

first adder means for adding a blocked addend to a blocked augend under a first premise that carry input data is 0, second adder means for adding said blocked addend to said blocked augend under a second premise that carry input data is 1, block-carry signal generator means for generating a block-carry signal based on a carry output signal from said first adder means and a carry output signal from said second adder means and a block-carry signal from an adjacent lower order block, and data selector means for selectively issuing one output signal from either said first adder means or said second adder means as a block-sum output signal, responding to said block-carry signal from an adjacent lower order block-adder means, a number of bits of said first adder means and said second adder means in a block-adder means being larger than a number of bits of said first adder means and said second adder means in an adjacent lower order block-order, thereby substantially synchronizing incoming times of said carry output signals from said first adder means and said second adder means with said block-carry signal from said adjacent lower order block-adder means.

2. A parallel binary adder in accordance with claim 1, wherein when a number of bits of said first adder means and said second adder means in one of said block-adder means is N, a number of bits of said first adder means and second adder means in the higher adjacent order block-adder means is $N+1$.

3. A parallel binary adder in accordance with claim 1, wherein a number of bits of said first adder means and said second adder means in said second order block-adder means is 4-bits.

4. A parallel binary adder in accordance with claim 1, wherein said block-carry signal generator means is a logic gate selected from a group consisting of OR-NAND circuits and AND-OR circuits.

* * * * *